Dec. 15, 1959  F. L. F. STEGHART ET AL  2,917,702
A-C BRIDGE NETWORK FOR AUTOMATIC CONTROLLERS
Filed Nov. 24, 1958
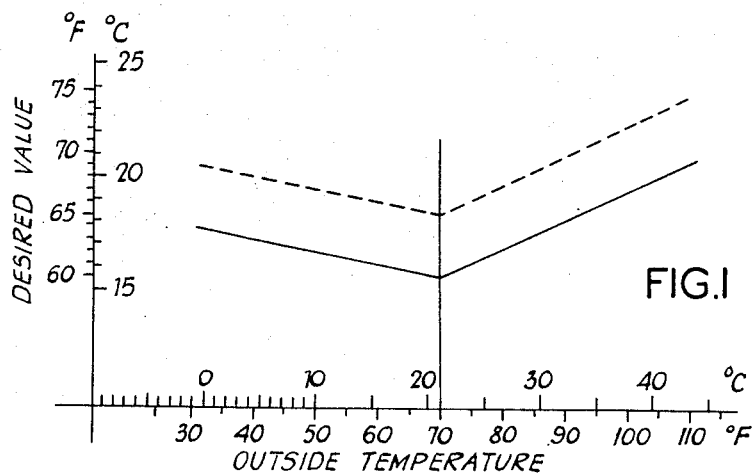
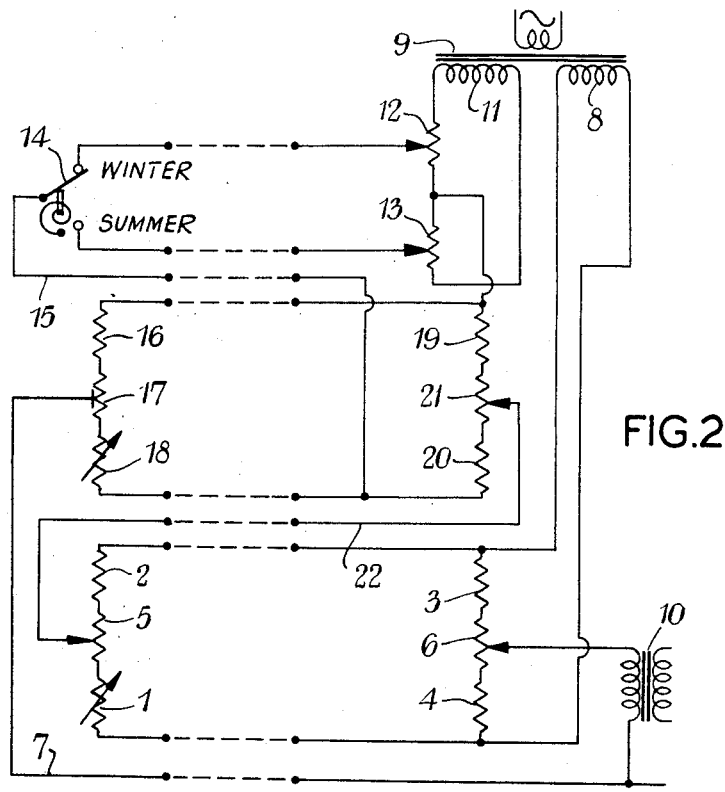
INVENTORS:
FRITZ LUDWIG FELIX STEGHART
PETER LESLIE KERSHAW
BY
Richardson, David and Verdon
ATT'YS United States Patent Office 2,917,702
Patented Dec. 15, 1959

2,917,702

A.-C. BRIDGE NETWORK FOR AUTOMATIC CONTROLLERS

Fritz Ludwig Felix Steghart, St. Albans, and Peter Leslie Kershaw, Pinner, England, assignors to The Rheostatic Company Limited, Slough, Buckinghamshire, England Application November 24, 1958, Serial No. 776,112

Claims priority, application Great Britain November 22, 1957

5 Claims. (Cl. 323—69)

This invention concerns improvements in or relating to automatic electronic controllers and has more particular reference to the measuring unit used with such controllers. It will be known that the basic elements of a controller are (a) a measuring unit (b) a controlling unit and (c) a correcting unit.

It is a function of the measuring unit to measure the physical value which is being controlled, for example temperature, and to compare the measured value with the desired value in order to provide an error signal. It is the function of the controlling unit to operate upon the error signal in order to provide an output which may, for example, depend upon a factor proportional to the error signal, a factor which is proportional to the integral of the error signal and often a third factor proportional to the differential of the error signal. This output is passed to a correcting unit which has the function of altering the physical value in such a direction and by such an amount as will tend to bring the measured value into agreement with the desired value as quickly as possible.

The present invention is particularly, but not exclusively, concerned with the control of temperature, for example in heating installations in buildings and the like. The object of the present invention is to provide a measuring unit which tends, in some ways, to simplify the operation of the controller as a whole.

According to the present invention there is provided, in or for an electronic controller, a measuring unit comprising a first element sensitive to the physical value being controlled in the controlled space and a second element sensitive to an associated physical value outside the controlled space, such first and second elements being inter-connected in such a manner that the associated physical value as measured by the second element introduces a bias into a bridge circuit including the first element, such bias being reversed at a certain level of the associated physical value and such bias serving to vary the desired physical value in the controlled space according to a pre-arranged relation.

In one particular embodiment of the present invention the controller is used to control the temperature in a building and to this end there is provided, inside the building, a resistance thermometer in a bridge network such that the bridge is unbalanced when the measured temperature departs from the desired temperature, the sense and magnitude of the error signal being a measure of the difference between the desired and measured temperatures. However, it has been found that when controlling temperature in this way the exterior temperature has psychological and physiological effects upon those within the controlled space and moreover it has also been found that the temperature within the controlled space may, under certain circumstances, be allowed to depart from the nominal desired value without causing any discomfort, the direction of departure being such as to effect a saving in the consumption costs. Thus to be more specific it has been found that during the winter when the outside temperature is below, for example 70° F. (21.1° C.) it is desirable to increase the inside temperature above the nominal desired value, for example 60° F. (15.6° C.), in dependence upon the outside temperature. In addition it will be observed that the heat losses from the controlled space are accelerated as the temperature falls and, therefore, it is possible that in this way some account is taken of those expected losses. However, the most important factor appears to be the fact that when the outside temperature is below the inside emperature, such objects as windows (which have a low thermal capacity and a low thermal insulation value) appear to radiate cold and, therefore, a person in the vicinity of such a window will feel what appears to be a cold radiation from the window. It is chiefly to counteract this effect that the temperature in the controlled space is increased and we have found that a very suitable rate of increase is 1° for 10° fall in the exterior temperature.

In the summer when the exterior temperature is considerably above the interior temperature, it has been found that an increase in the interior temperature can be tolerated and may indeed be welcomed, and it will also be appreciated that this has considerable operating advantages for it minimises the cost of cooling. Thus in a very convenient summer arrangement the desired value may be allowed to increase by about 2.5° for each 10° rise in exterior temperature.

In order to assist in the understanding of the present invention, certain comments may conveniently be made concerning the present practice in the control of the temperature of buildings. At the present time, apart from controllers based upon the present invention and associated inventions, the only commercially available controllers for the temperature of buildings are proportional controllers and it will be known that the control function of a proportional controller is different from the control function of a proportional plus integral controller, whether or not the integral controller includes a differential function. Thus in a proportional controller, the control point is not a true point but is a band of temperatures on either side of the nominal control point and in a typical example is of a width of 5° F. (2.6° C.). It follows therefore that the temperature in the controlled space may vary in this band without actually causing the controller to call for more or less heat. It is inevitable, therefore, that the result of a call by the controller for more heat results in the stabilisation of the temperature in the controlled space at a level different from that maintained before the call for more heat, this being an accepted disadvantage of proportional controllers. On the other hand, proportional plus integral controllers operate so as to maintain the temperature in the controlled space at the desired temperature and no band setting is necessary. Thus, depending on the sensitivity of the controller (which is normally very high), a departure of say 1° F. (5/9° C.) from the desired temperature will cause operation of the controller until the controlled temperature is returned to the desired value.

In proportional controllers it has been proposed to provide, in addition to the temperature sensitive device in the controlled space, a temperature sensitive device situated outside the controlled space, for example in a location responsive to outside temperature, and to carry out an averaging of the temperatures recorded by these two temperature responsive means so that the controller measures a temperature which is dependent upon inside and outside temperatures, frequently means being provided to vary the "authority" of the two temperature measuring devices so that the inside temperature may have a greater effect than the outside temperature. However the function of this arrangement is to provide an input to the controller which although nominally the temperature of the controlled space is in point of fact some other temperature. In this way, a form of compensation is provided for the outside temperature by deliberate distortion of the temperature which is alleged to be the temperature of the controlled space.

We believe that this arrangement is unsatisfactory for obtaining the best results from a proportional plus integral controller although the arrangement may readily be applied to such a controller under different circumstances. Thus the arrangement of averaging may very suitably be applied to a proportional plus integral controller if it is desired to make the measured temperature dependent upon the temperatures in various parts inside the controlled space.

In complete contradistinction and in accordance with this invention, the desired value of the controlled temperature is varied in accordance with the outside temperature.

Thus to sum up, in the prior arrangement the measured value of the temperature is varied in accordance with the outside temperature whilst in accordance with this invention the desired value of the controlled temperature is varied in accordance with the outside temperature.

In order that the invention may more readily be understood the same will now be described with reference to the drawings accompanying this specification in which:

Figure 1 is a graph showing the bias introduced into the desired value; and

Figure 2 is a circuit diagram of the measuring unit for attachment to a controller.

Referring firstly to Figure 1, it will be seen that there is there illustrated a graph showing the desired value plotted against the outside temperature. For normal circumstances, the desired value has been set for 60° F. (15.6° C.) and this assumes an outside temperature of 70° F. (21.1° C.). However, if the outside temperature falls, e.g. during the winter, then the desired value rises at a rate of 1° per 10° fall in outside temperature. Similarly in the summer, the desired value rises by 2.5° for each 10° rise in outside temperatures. The solid line shows the desired value as maintained by the heating and ventilating plant but the dotted line which is spaced some 5° F. (2.8° C.) above the solid line shows the temperature at which cooling comes into operation, it being convenient in many cases that cooling should not take effect immediately the heating plant is switched off.

Referring now to Figure 2, there is there illustrated a temperature sensitive element 1 (shown as a variable resistance) which is a resistance thermometer located in the controlled space. This resistance thermometer 1 (which may have a positive or negative temperature coefficient) is connected in a bridge circuit with fixed resistances 2, 3 and 4 and two potentiometers 5 and 6. The dotted lines shown in the earth line 7 and between the resistances 1 and 4 and between the resistances 2 and 3 depict connections to the unit comprising the resistances 1, 2 and 5 which is physically mounted in the controlled space remote from the controller itself. The three line connection is such that heating effects on the wires are minimised. The desired value is set by the potentiometer 5 (located in the controlled space) or it may alternatively be set by the potentiometer 6 (located at the controller). The input to the bridge is an alternating current input connected across the ends of the resistances 3 and 4 and derived from a winding 8 upon a mains transformer 9 whilst the output from the bridge is taken from the slider of the potentiometer 6 and is passed to an input transformer 10. The precise form of the controller itself is not significant in the present case and, therefore, no controller is illustrated but it may be mentioned that very suitable controllers are the various forms of proportional plus integral controller described and claimed in the co-pending applications Ser. Nos. 538,498 and 644,035 and our co-pending application entitled Electronic Controllers executed of even date with this application.

An additional winding 11 on the transformer 9 feeds two potentiometers 12 and 13 which are connected in series and the sliders of these potentionmeters 12 and 13 are taken to the terminals of the change-over thermostat 14. Very conveniently the change-over thermostat 14 operates at a temperature of 70° F. (21.1° C.) and it will be understood that at this temperature there is a change-over in a lead 15 giving a phase shift of 180° relative to the point of connection of the two potentiometers 12 and 13. This point of connection of the two potentiometers 12 and 13 is taken to one corner of a further bridge circuit and the opposite corner of the bridge circuit is connected to the lead 15 and, therefore when the outside temperature is 70° F. (21.1° C.), the bridge supply changes phase. One side of the bridge is formed by a fixed resistance 16, a pre-set potentiometer 17 and a resistance thermometer 18 and this part of the bridge is located outside the space to be controlled or in the fresh air duct. The other half of the bridge is located in the controller or adjacent thereto and comprises a pair of fixed resistances 19 and 20 connected by a pre-set potentiometer 21. The pre-set potentiometers 17 and 21 are used for balancing the bridge at 70° F. (21.1° C.) or whatever other temperature may be selected and the potentiometers 12 and 13 control the degree of rise and fall as will be understood.

Finally the slider of the pre-set potentiometer 21 is connected to the slider of the potentiometer 5 by a lead 22.

It will be understood that when the outside temperature is below 70° F. (21.1° C.) the thermostat 14 makes in the "winter" position and supplies a potential depending upon the setting of the potentiometer 12 to the bridge including the resistance thermometer 18 and, therefore, depending upon the temperature of this resistance thermometer, delivers a further potential via the pre-set potentiometer 21 and the lead 22 to the main bridge which includes the resistance thermometer 1. The effect is to produce an apparent bias in the desired value which depends upon the outside temperature. Clearly if the outside temperature is above 70° F. (21.1° C.) the thermostat 14 changes over to make in the "summer" position.

It should be understood finally that it is not necessary to use alternating current and that direct current is equally suitable. In that case the input transformer 10 is replaced by appropriate means sensitive to direct current.

We claim:

1. In an electronic controller, a measuring unit comprising a first element sensitive to the physical value being controlled in the controlled space, a bridge circuit including the first element, unbalance in the bridge serving to actuate the electronic controller, a second element sensitive to an associated physical value outside the controlled space, an electrical supply to said second element and from thence to said bridge circuit, such second element controlling the value of the electrical supply to such bridge circuit to form a bias, and means to reverse the bias at a certain level of the associated physical value.

2. In an electronic controller for the control of temperature in a controlled space, a measuring unit comprising a first bridge circuit, a first resistance thermometer located in such bridge circuit and sensitive to the temperature within the controlled space, a first source of electrical energy for connection to said bridge circuit, a bias supply for connection to said bridge circuit, a second resistance thermometer in said bias supply and positioned to vary such bias supply in response to the temperature outside said controlled space, and means to reverse said bias supply at a certain level of the outside temperature.

3. In an electronic controller for the control of temperature in a controlled space, a measuring unit comprising a first bridge circuit, unbalance in said first bridge circuit serving to actuate the controller; an electrical supply to said first bridge circuit; a first resistance thermometer located in said first bridge circuit and positioned to be sensitive to the temperature within the controlled space; a second bridge circuit; an electrical supply to said second bridge circuit; a second resistance thermometer in said second bridge circuit and positioned to be responsive to the temperature outside the controlled space; a connection from said second bridge circuit to said first bridge circuit whereby unbalance in said second bridge circuit introduces a bias into said first bridge circuit; and means to change the polarity of the electrical supply to said second bridge circuit at a specific level of the outside temperature.

4. The apparatus of claim 3 in which the output of the second bridge for a specific degree of unbalance is different for the two polarities of the supply to such bridge.

5. In a proportional plus integral electronic controller for the control of temperature in a controlled zone, a measuring unit comprising a first bridge; an output connection from said first bridge to provide an error signal when the bridge is unbalanced and for connection to the electronic controller; a first resistance thermometer connected in circuit in said first bridge and located in the controlled zone; an electrical supply to said first bridge; a second bridge; a connection from said second bridge to said first bridge to provide a bias supply to said first bridge when said second bridge is unbalanced; a second resistance thermometer connected in circuit in said second bridge and responsive to the temperature outside the controlled zone; a second electrical supply circuit including two potentiometers in series; a connection from between said two potentiometers to one corner of said second bridge; and a temperature responsive change-over switch selectively connecting the sliders of said two potentiometers to the corner of said second bridge remote from the first said corner, said temperature responsive change-over switch being located in a position to be responsive to the temperature outside the controlled space.

No references cited.